US012664797B2

(12) United States Patent
Shinozaki

(10) Patent No.: US 12,664,797 B2
(45) Date of Patent: Jun. 23, 2026

(54) ELECTRONIC DEVICE, INFORMATION PROCESSING APPARATUS, DEGREE-OF-CONCENTRATION CALCULATION PROGRAM, AND DEGREE-OF-CONCENTRATION CALCULATION METHOD

(71) Applicant: KYOCERA Corporation, Kyoto (JP)

(72) Inventor: Takayuki Shinozaki, Tokyo (JP)

(73) Assignee: KYOCERA Corporation, Kyoto (JP)

( * ) Notice: Subject to any disclaimer, the term of this patent is extended or adjusted under 35 U.S.C. 154(b) by 387 days.

(21) Appl. No.: 18/255,564

(22) PCT Filed: Dec. 1, 2021

(86) PCT No.: PCT/JP2021/044157
§ 371 (c)(1),
(2) Date: Jun. 1, 2023

(87) PCT Pub. No.: WO2022/118900
PCT Pub. Date: Jun. 9, 2022

(65) Prior Publication Data
US 2024/0005677 A1     Jan. 4, 2024

(30) Foreign Application Priority Data
Dec. 3, 2020     (JP) ................................. 2020-201114

(51) Int. Cl.
*G06V 20/59*      (2022.01)
*G06T 7/70*       (2017.01)
*G06V 10/776*     (2022.01)

(52) U.S. Cl.
CPC .............. *G06V 20/597* (2022.01); *G06T 7/70* (2017.01); *G06V 10/776* (2022.01);
(Continued)

(58) Field of Classification Search
CPC ...... G06V 20/597; G06V 10/776; G06T 7/70; G06T 2207/20081; G06T 2207/30196;
(Continued)

(56) References Cited

U.S. PATENT DOCUMENTS 8,085,140 B2     12/2011  Mochizuki et al.
11,587,461 B2*   2/2023   Telpaz ................. G06V 20/597
(Continued)

FOREIGN PATENT DOCUMENTS

JP    2016-130959 A    7/2016
WO    2008/029802 A1   3/2008
WO    2020/122986 A1   6/2020

*Primary Examiner* — Delomia L Gilliard
(74) *Attorney, Agent, or Firm* — Studebaker Brackett PLLC

(57)                    ABSTRACT
An electronic device 10 includes an image-capturing unit 11, a line-of-sight detector 12, and a controller 14. The image-capturing unit 11 generates an image corresponding to a view by performing image capturing. The line-of-sight detector 12 detects a line of sight of a subject with respect to the view. The controller 14 determines, based on the image, the reliability of the image as a source of estimation of the degree of concentration of the subject. The controller 14 estimates the degree of concentration of the subject based on the reliability, the image, and the line of sight.

14 Claims, 6 Drawing Sheets

(52) U.S. Cl.
CPC ............... *G06T 2207/20081* (2013.01); *G06T 2207/30196* (2013.01); *G06T 2207/30268* (2013.01)

(58) Field of Classification Search
CPC ............. G06T 2207/30268; G06T 7/20; G06T 2207/10016; G06T 2207/20076; G06T 2207/20084; G06T 7/00; B60W 40/08; G08G 1/166

See application file for complete search history.

(56) References Cited

U.S. PATENT DOCUMENTS

| | | | |
|---|---|---|---|
| 12,195,022 B2 * | 1/2025 | Chan | G05D 1/0061 |
| 2021/0217195 A1 * | 7/2021 | Hwang | G06T 7/74 |
| 2021/0357670 A1 * | 11/2021 | Wu | G06T 7/70 |
| 2022/0366178 A1 * | 11/2022 | Liu | G06V 20/56 |
| 2023/0284902 A1 * | 9/2023 | Miseikis | G06V 10/82 |
| 2024/0071108 A1 * | 2/2024 | Edwards | G06V 40/20 |

* cited by examiner

IM

LS

PE

IM

MP

ELECTRONIC DEVICE, INFORMATION PROCESSING APPARATUS, DEGREE-OF-CONCENTRATION CALCULATION PROGRAM, AND DEGREE-OF-CONCENTRATION CALCULATION METHOD

CROSS-REFERENCE TO RELATED APPLICATIONS

This application claims priority of Japanese Patent Application No. 2020-201114 filed in Japan on Dec. 3, 2020 and the entire disclosure of this application is hereby incorporated by reference.

TECHNICAL FIELD

The present disclosure relates to an electronic device, an information processing apparatus, a degree-of-concentration calculation program, and a degree-of-concentration calculation method.

BACKGROUND OF INVENTION

The attention of the driver is required for safe operation of a mobile object. Therefore, studies have been conducted on observing the driver's attention and issuing warnings to the driver or providing driving assistance when the driver's attention decreases. As a way of observing attention, a method has been proposed in which cumulative visibility, which is a cumulative value of the degree of overlap of the line of sight with an object such as an oncoming vehicle around the driver's own vehicle, is calculated and compared with a reference value (refer to Patent Literature 1).

CITATION LIST

Patent Literature

Patent Literature 1: International Publication No. 2008-029802

SUMMARY

In a First Aspect of the present disclosure, an electronic device includes an image-capturing unit, a line-of-sight detector, and a controller.

The image-capturing unit is configured to generate an image corresponding to a view by performing image capturing.

The line-of-sight detector is configured to detect a line of sight of a subject with respect to the view.

The controller is configured to determine, based on the image, a reliability of the image as a source of estimation of a degree of concentration of the subject and is configured to estimate the degree of concentration of the subject based on the reliability, the image, and the line of sight.

In a Second Aspect, an information processing apparatus includes an acquiring unit, a controller, and an output unit.

The acquiring unit is configured to acquire an image corresponding to a view and a line of sight of a subject to the view.

The controller is configured to determine, based on the image, a reliability of the image as a source of estimation of a degree of concentration of the subject and is configured to estimate the degree of concentration of the subject based on the reliability, the image, and the line of sight. The output unit is configured to output the degree of concentration.

In a Third Aspect, a degree-of-concentration calculation program is configured to cause a computer to function as an image-capturing unit, a line-of-sight detector, and a controller.

The image-capturing unit is configured to generate an image corresponding to a view by performing image capturing.

The line-of-sight detector is configured to detect a line of sight of a subject with respect to the view.

The controller is configured to determine, based on the image, a reliability of the image as a source of estimation of a degree of concentration of the subject and configured to estimate the degree of concentration of the subject based on the reliability, the image, and the line of sight.

In a Fourth Aspect, a degree-of-concentration calculation method includes:

generating an image corresponding to a view by performing image capturing;

detecting a line of sight of a subject to the view;

determining, based on the image, a reliability of the image as a source of estimation of a degree of concentration of the subject; and estimating the degree of concentration of the subject based on the reliability, the image, and the line of sight.

DESCRIPTION OF EMBODIMENTS

Figure 1:
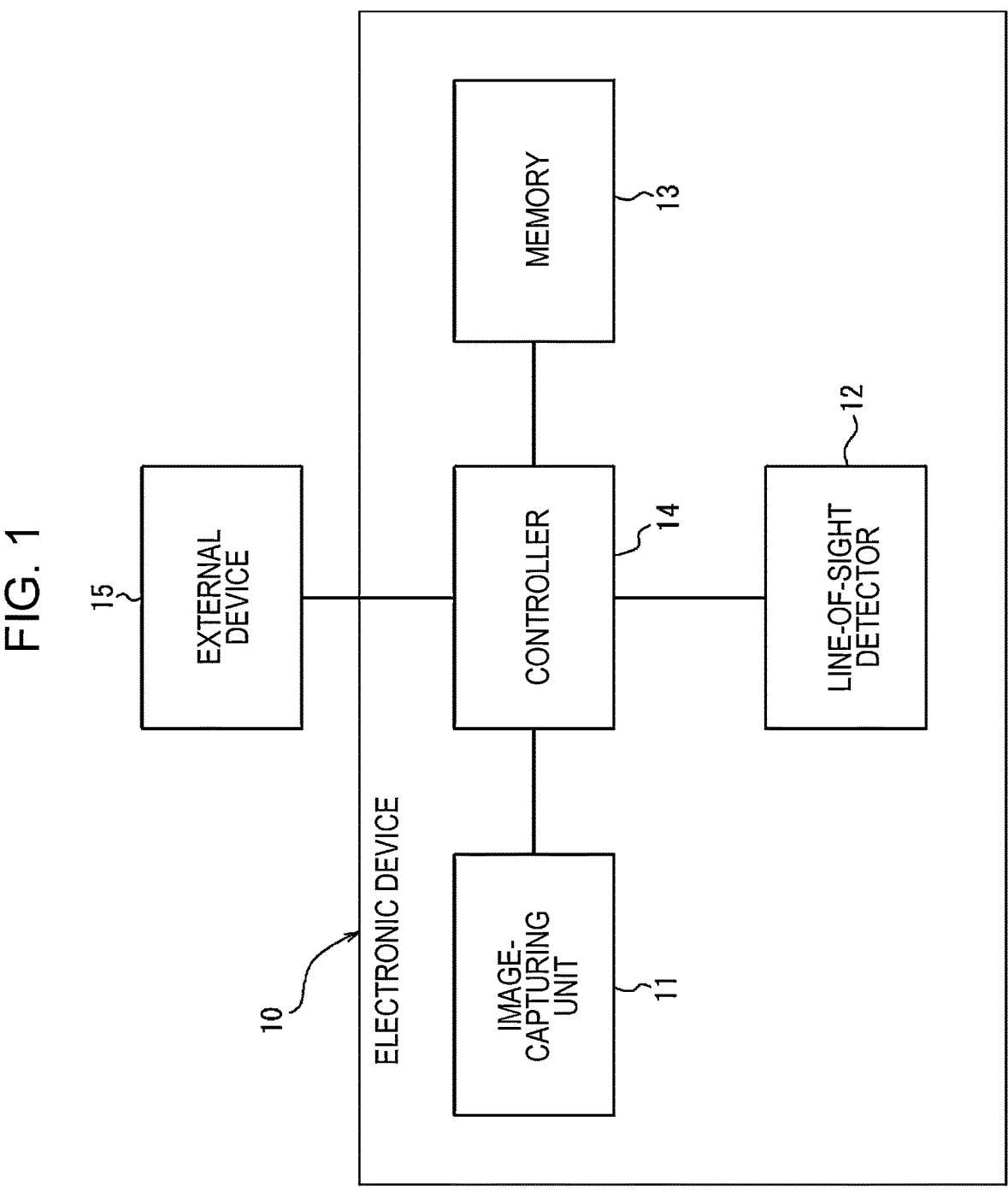
FIG. 1 is a block diagram illustrating the outline configuration of an electronic device according to a First Embodiment.

Hereafter, electronic devices to which embodiments of the present disclosure have been applied will be described while referring to the drawings. The following description also serves as a description of an information processing apparatus, a degree-of-concentration calculation program, and a degree-of-concentration calculation method to which the present disclosure has been applied.

An electronic device according to a First Embodiment of the present disclosure is provided in a mobile object, for example. Examples of such mobile objects may include vehicles, ships, and aircraft. Vehicles may include, for example, automobiles, industrial vehicles, rail vehicles, motorhomes, and fixed-wing aircraft that taxi along runways. Automobiles may include, for example, passenger cars, trucks, buses, motorcycles, and trolleybuses. Industrial vehicles may include, for example, industrial vehicles used in agriculture and construction. Industrial vehicles may include, for example, forklift trucks and golf carts. Industrial vehicles used in agriculture may include, for example, tractors, cultivators, transplanters, binders, combine harvesters, and lawn mowers. Industrial vehicles used in construction may include, for example, bulldozers, scrapers, excavators, cranes, dump trucks, and road rollers. Vehicles may include vehicles that are human powered. The categories of vehicles are not limited to the above examples. For example, automobiles may include industrial vehicles that can travel along roads. The same vehicles may be included in multiple categories. Ships may include, for example, jet skis, boats, and tankers. Aircraft may include, for example, fixed-wing and rotary-wing aircraft.

As illustrated in FIG. 1, an electronic device 10 according to the First Embodiment of the present disclosure includes an image-capturing unit 11, a line-of-sight detector 12, a memory 13, and a controller 14.

The image-capturing unit 11 is, for example, provided in a mobile object so as to be capable of capturing images of the view in the direction of movement of the mobile object. The image-capturing unit 11 is, for example, a camera capable of capturing images at a rate of 30 fps. The image-capturing unit 11 generates an image corresponding to the view by performing image capturing.

Figure 2:
FIG. 2 is a diagram for describing the relationship between a line of sight detected by a line-of-sight detector and an image.
Figure 2:
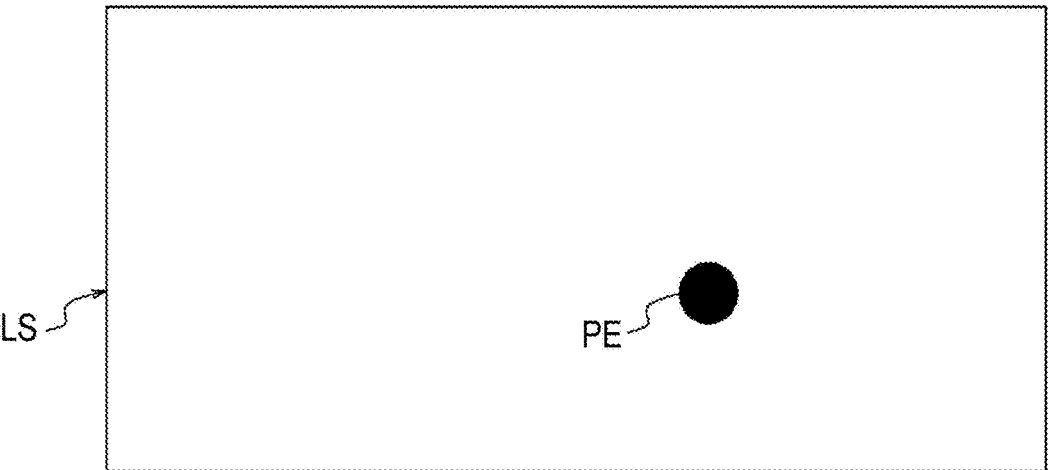

The line-of-sight detector 12 is, for example, provided in the mobile object so as to capable of detecting the line of sight of a subject sitting in the driver's seat of the mobile object. The line-of-sight detector 12 is, for example, either a contact-type eye tracker or a non-contact type eye tracker, and detects the line of sight of the subject with respect to the view. As illustrated in FIG. 2, a line of sight LS is, for example, illustrated as the direction of a line of sight LS corresponding to a position PE in the same coordinate system as an image IM generated by image capturing performed by the image-capturing unit 11.

The line-of-sight detector 12 may detect line-of-sight data by detecting a time series of the line of sight LS as line-of-sight data. More specifically, the line-of-sight detector 12 may detect a position PE of the line of sight on the image IM every time interval and output a time series of the positions PE of the line of sight LS as the line-of-sight data. The line-of-sight detector 12 may detect the line of sight LS at a higher rate, i.e., at a higher frequency than the image-capturing unit 11, and may accumulate a time series of the detected positions PE of the line of sight LS, and output the accumulated positions PE as a path of the line of sight LS in a single image IM.

The memory 13 includes any suitable storage device such as a random access memory (RAM) and a read only memory (ROM). The memory 13 stores various programs that allow the controller 14 to function and various kinds of information used by the controller 14.

The controller 14 includes one or more processors and memories. Such processors may include general-purpose processors into which specific programs are loaded in order to perform specific functions, and dedicated processors dedicated to specific processing. Dedicated processors may include an application specific integrated circuit (ASIC). Processors may include programmable logic devices (PLDs). PLDs may include field-programmable gate arrays (FPGAs). The controller 14 may be either a system-on-a-chip (SoC) or a system in a package (SiP), in which one or more processors work together. The controller 14 controls operation of each component of the electronic device 10.

In normal operation, the controller 14 causes the image-capturing unit 11 to perform continuous image capturing at a rate of, for example, 30 fps and continuously acquires the images IM as information. The controller 14 causes the line-of-sight detector 12 to detect the line of sight LS of the subject while the image-capturing unit 11 is performing image capturing and acquires the line of sight LS in a time period substantially coinciding with the time point of capture of the image IM. The meaning of "a time period substantially coinciding with a time point of capture of the image IM" may include a single time point of detection or may include multiple time points of detection during the period from a time point of the image capture immediately preceding capture of the most recent image IM to a time point of the most recent capture of an image IM. In the case of a single time point of detection of the line of sight LS, the time period substantially coinciding with a time point of capture of the image IM does not need to include the exact time point, and the time period may include the time point closest to the time point of capture of the image IM in line of sight detection performed in the same period as the image capturing. The controller 14 associates the image IM and the line of sight LS detected in a period substantially coinciding with the time point of capture of the image IM and stores the associated image IM and line of sight LS in the memory 13.

The controller 14 may perform image processing on the acquired image IM. As described later, in a configuration where an estimator is trained using an image IM on which prescribed image processing has been performed, the controller 14 performs the prescribed image processing on an acquired image IM and stores the resulting image IM in association with the line of sight LS in the memory 13. The prescribed image processing may be, for example, processing for generating a semantic segmentation image based on the acquired image IM. A semantic segmentation image is an image in which a label or a category has been assigned to all pixels within the image IM.

The controller 14 may determine the reliability of the image IM based on the image IM. As discussed below, in this embodiment, the degree of concentration is estimated based on the line of sight LS for a particular image IM. The accuracy with which the degree of concentration is estimated can depend on the elements included in the image and so on. The reliability of image IM is an indicator representing the suitability of the image IM as a source to use in estimation of the degree of concentration.

The controller 14 may determine the reliability by calculating the reliability based on at least one out of the type, the number, and the position within an image IM of an element included in an image IM detected by image recognition. Elements include, for example, at least one out of vehicles, pedestrians, road geometry, signs, and signals. The elements may include at least one of the optical flow, in other words, motion, of vehicles, pedestrians, road geometry, signs, and signals in a configuration where reliability is calculated based on multiple images IM. For example, reliability may be calculated so that the reliability increases as the number of detected elements increases. The reliability may be calculated so that the reliability is higher when the type of element detected is a target whose behavior requires the driver's attention, such as a vehicle, a pedestrian, and so on. The reliability may be calculated, for example, so as to be lower than that for a vehicle or the like, when the type of element detected is a target that is fixed to the ground such as a sign, a signal, or the like and therefore does not require attention in regard to its behavior. The reliability may be calculated so as to be higher, the closer the position of a detected element is to the mobile object and the path of travel of the mobile object. The reliability may be calculated so as to be higher, the more complex the detected road geometry.

Alternatively, the controller 14 may determine the reliability by functioning as a reliability estimator that calculates the reliability based on the image IM. A reliability estimator may be constructed from learning data obtained by machine learning the relationship between learning images and information about reliability. Information about reliability may be a degree of concentration calculated using rules mentioned above based on elements included in the learning images.

The controller 14 may estimate the degree of concentration of the subject based on the determined reliability, the image IM generated by the image-capturing unit 11, and the line-of-sight detector 12. In the First Embodiment, the controller 14 determines whether or not estimation of the degree of concentration is possible based on the reliability.

The controller 14 stops estimation of the degree of concentration when the reliability is less than or equal to a reliability threshold. The controller 14 may decrease the reliability threshold the longer the time for which estimation of the degree of concentration is stopped. The controller 14 may return the lowered reliability threshold to the initial value after performing estimation of the degree of concentration.

The controller 14 performs estimation of the degree of concentration when the reliability exceeds the reliability threshold. The controller 14 estimates the degree of concentration of the subject based on an image IM and a line of sight LS, the line of sight LS being detected during a time period that substantially coincides with the time point of capture of the image IM. The controller 14 may estimate the degree of concentration by functioning as an estimator constructed using machine-learned learning data. The estimator may be constructed using a neural network having a multilayer structure.

The estimator may, for example, directly estimate the degree of concentration based on the image IM and the line of sight LS of the subject. The estimator may be constructed based on learning data obtained by machine learning the relationship between a learning image, an actual line of sight, and biological information relating to a degree of concentration using multiple sets of a learning image, an actual line of sight of a learning subject with respect to a view corresponding to the learning image, and the degree of concentration of the learning subject.

Figure 3:
FIG. 3 is a diagram illustrating a specific example of a line-of-sight prediction map estimated for an image.
Figure 3:
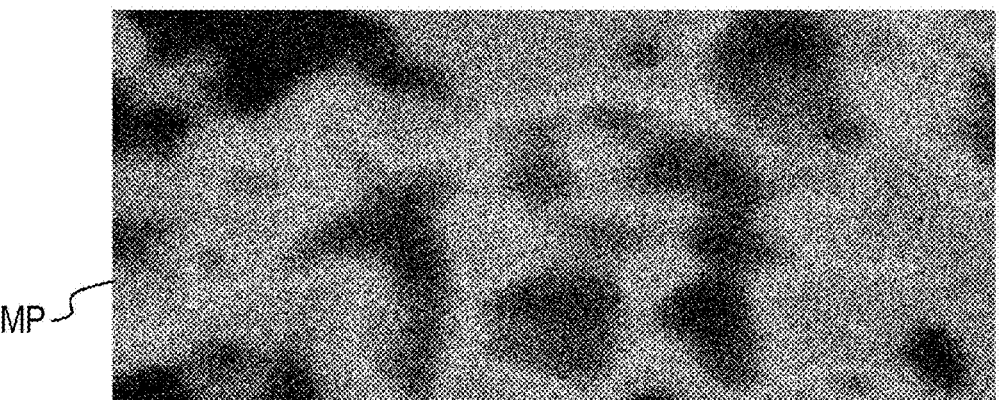

Alternatively, the estimator may, for example, estimate a line-of-sight prediction map based on an image IM and estimate the degree of concentration based on the line-of-sight prediction map and the line of sight LS of the subject. As illustrated in FIG. 3, a line-of-sight prediction map MP is a two-dimensional map representing the probability of a typical subject looking at each position in an image IM corresponding to a specific view, i.e., the probability of the line of sight LS being directed at that position. The estimator may include a first estimator that estimates a line-of-sight prediction map MP based on an image IM, and a second estimator that estimates the degree of concentration based on the line-of-sight prediction map MP and the line of sight LS of the subject. The first estimator may be constructed using learning data obtained by machine learning the relationship between a learning image and an actual line of sight using multiple sets of an actual line of sight of the learning subject to a view corresponding to the learning image. The second estimator may be constructed using learning data obtained by machine learning the relationship between a learning line-of-sight prediction map, an actual line of sight, and a degree of concentration using multiple sets of a learning line-of-sight prediction map estimated based on a learning image by the first estimator, an actual line of sight of a learning subject to a view corresponding to the learning image, and the degree of concentration of the learning subject.

Alternatively, the estimator may, for example, estimate a line-of-sight prediction map for a subject with a degree of concentration within a prescribed range based on an image IM. The controller 14 may calculate the degree of concentration of the subject based on the estimated line-of-sight prediction map and the line of sight LS of the subject. The controller 14 may, for example, identify a position in the line-of-sight prediction map corresponding to the line of sight LS of the subject or a region including that position. The controller 14 may further calculate the degree of concentration in accordance with the probability at the position in the line-of-sight prediction map, or in accordance with an average or weighted average of the probabilities in the region, and so on. The controller 14 may calculate the degree of concentration, for example, using a function or table, so that the greater the probability, the lower the degree of concentration. For example, the controller 14 may calculate the degree of concentration of the subject so that the greater the probability, the closer the degree of concentration of the subject is to a specific value such as an average, maximum, or minimum value within a prescribed range. The estimator may be constructed based on learning data obtained by machine learning the relationship between a learning image and the actual line of sight of a learning subject when the degree of concentration of the learning subject with respect to the learning image is within the prescribed range.

Alternatively, for example, the estimator may estimate, for each of multiple load factors, a low-concentration heat map based on an image IM for when the load of a particular load factor acts. A low-concentration heat map is a two-dimensional map representing the probability of a typical subject looking at each position in an image IM corresponding to a specific view, i.e., the probability of the line of sight being directed at that position, when the subject experiences the load of a specific load factor. Load factors are various factors that can negatively affect a typical subject's concentration while performing an activity such as driving, and include, for example, having a conversation with a passenger, conducting a hands-free conversation, listening to radio audio, contemplation, drowsiness, fatigue, and so on. In addition, the estimator may, for example, estimate a high-concentration heat map based on an image IM for when all the specific load factors on a subject have been removed or the loads have been reduced. The high-concentration heat map is a two-dimensional map representing the probability of a typical subject looking at each position in an image IM corresponding to a specific view, i.e., the probability of the line of sight being directed at that position, when the loads of all the load factors acting on the subject have been removed or the loads have been reduced. The controller 14 may read out the probability of the position PE corresponding to the line of sight LS of the subject in all the low-concentration heat maps and the high-concentration heat map. The controller 14 may select the heat map having the highest read-out probability from among a low-concentration heat map group and the high-concentration heat map. The controller 14 may calculate the degree of concentration based on a reference value defined for the selected heat map. For example, a reference value within a degree of concentration range greater than or equal to 0% and less than 50% may be defined for all the low-concentration heat maps. For example, a reference value may be defined within a degree of concentration range greater than or equal to 50% and less than or equal to 100% for the high-concentration heat map. If the heat map in which the probability of the position PE corresponding to the line of sight LS is highest is any of the low-concentration heat maps, the controller 14 may calculate the reference value defined for that low-concentration heat map as the degree of concentration of the subject. If the heat map in which the probability of the position PE corresponding to the line of sight LS is highest is the high-concentration heat map, the controller 14 may calculate the reference value defined for the high-concentration heat map as the degree of concentration of the subject. The controller 14 may calculate the degree of concentration based on not only the type of heat map selected, but also based on the probability of the position PE corresponding to the line of sight LS in that heat map. For example, a function or table may be defined so that the degree of concentration is calculated as a smaller value as the probability increases in a low-concentration heat map. Furthermore, for example, a function or table may be defined so that the degree of concentration is calculated as a larger value as the probability increases in the high-concentration heat map. The controller 14 may calculate the degree of concentration using a function or table defined for the selected heat map based on the probability of the position PE corresponding to the line of sight LS. The estimator may include a fourth estimator that estimates a low-concentration heat map for each of multiple load factors and a fifth estimator that estimates a high-concentration heat map. The fourth estimator may be constructed using learning data obtained by machine learning the relationship between a learning image and the line of sight to the learning image when the learning subject is subjected to a load that reduces his or her concentration for each load factor. The fifth estimator may be constructed using learning data obtained by machine learning the relationship between a learning image and the line of sight to the learning image when the load acting on the learning subject has been removed.

The controller 14 may estimate the degree of concentration based on multiple continuously captured images IM and the lines of sight LS corresponding to the images IM. The controller 14, for example, may estimate the degree of concentration based on images IM of frames within a prescribed time interval backwards from the most recent image IM. The controller 14 may estimate the degree of concentration by excluding, from among the multiple continuously captured images IM, images IM for which the speed of movement of the line of sight LS is greater than or equal to a speed threshold. More specifically, when the amount of movement of a line of sight LS at a particular detection time from the line of sight LS at the immediately previous detection time exceeds an amount of movement threshold, the controller 14 may exclude the image IM associated with the detection time of the line of sight LS at that particular detection time. In other words, the controller 14 may exclude information during a saccade. The reason for excluding such information is that a saccade is an action that takes place during the process of moving to the next point that will be looked at, and the position PE of the line of sight LS during the saccade has no meaning as a point being looked at. The controller 14 may determine whether or not a saccade is occurring based on the speed of movement of the position PE of the line of sight LS.

The controller 14 may output the calculated degree of concentration to an external device 15. The external device 15 is a device that performs a prescribed operation based on the degree of concentration. The external device 15 is, for example, a warning device that alerts the subject when the degree of concentration is less than or equal to a warning threshold, a driving assistance device that assists the subject in driving the mobile object based on the degree of concentration, or a driving device that operates the mobile object based on the degree of concentration.

Figure 4:
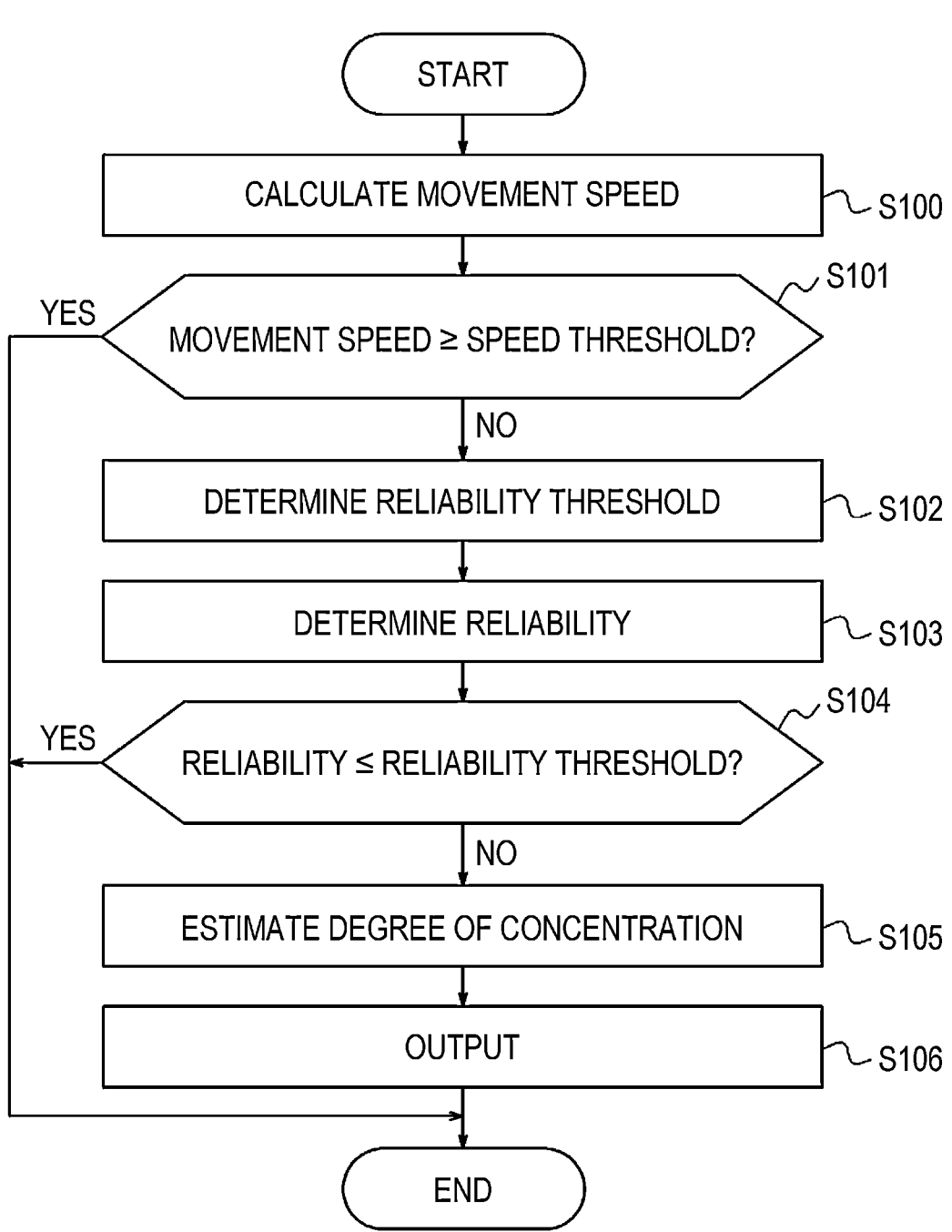
FIG. 4 is a flowchart for describing estimation processing performed by a controller in FIG. 1 in the First Embodiment.

Next, estimation processing executed by the controller 14 in the First Embodiment will be described using the flowchart in FIG. 4. The estimation processing starts whenever the controller 14 acquires an image IM of one frame and a line of sight LS.

In Step S100, the controller 14 calculates the movement speed of the acquired line of sight LS based on a comparison with a position PE of the line of sight LS acquired immediately previously. After the calculation, the process advances to Step S101.

In Step S101, the controller 14 determines whether the movement speed calculated in Step S101 is greater than or equal to a speed threshold. When the movement speed is greater than or equal to the speed threshold, the estimation processing ends. When the movement speed is not greater than or equal to the speed threshold, the process advances to Step S102.

In Step S102, the controller 14 determines a reliability threshold based on the time for which estimation of the degree of concentration is stopped. After the determination, the process proceeds to Step S103.

In Step S103, the controller 14 determines the reliability based on the image IM acquired at the start of the estimation processing. After the determination, the process proceeds to Step S104.

In Step S104, the controller 14 determines whether or not the reliability determined in Step S103 is less than or equal to the reliability threshold determined in Step S102. When the reliability is less than or equal to the reliability threshold, the estimation processing ends. When the reliability is not less than or equal to the reliability threshold, the process advances to Step S105.

In Step S105, the controller 14 estimates the degree of concentration based on the image IM and the line of sight LS acquired at the start of the estimation processing. After the estimation, the process advances to Step S106.

In Step S106, the controller 14 outputs the degree of concentration calculated in Step S105 to the external device 15. After the output, the estimation processing ends.

The thus-configured electronic device 10 of the First Embodiment determines the reliability of the image IM based on the image IM, and estimates the degree of concentration of the subject based on the reliability, the image IM, and the line of sight LS. For example, the object being looked at and the direction of gaze generally vary for a variety of views, such as highways, urban areas, suburban areas, and residential areas. Therefore, improving the accuracy with which the degree of concentration is estimated by simply detecting only movement of the line of sight LS is difficult. Even in a variety of views, improving the accuracy of estimation of the degree of concentration is difficult because movement of the line of sight is monotonic regardless of the degree of concentration of the subject in situations where there are few vehicles and pedestrians, straight roads with no intersections or curves, and so on. On the other hand, with the above-described configuration, the electronic device 10 estimates the degree of concentration based on reliabilities for images IM of various views, and therefore can estimate the degree of concentration with a high degree of accuracy. Since the attention of a person is affected by the degree of concentration, the electronic device 10 is capable of improving the accuracy with which the attention of a subject is estimated in various situations.

The electronic device 10 of the First Embodiment stops estimating the degree of concentration when the reliability is less than or equal to the reliability threshold, and this configuration allows the electronic device 10 to estimate only a degree of concentration having a reliable estimation accuracy.

The electronic device 10 of the First Embodiment decreases the reliability threshold by a greater amount, the longer the time for which estimating of the degree of concentration is stopped. This configuration allows the electronic device 10 to avoid there being prolonged periods of time during which the degree of concentration is not estimated.

Next, an electronic device 10 according to a Second Embodiment of the present disclosure will be described. The method used to calculate the degree of concentration in the Second Embodiment is different from that in the First Embodiment. Hereafter, the Second Embodiment will be described focusing on points that are different from in the First Embodiment. Parts having the same configuration as in the First Embodiment are denoted by the same reference symbols.

As illustrated in FIG. 1, the electronic device 10 according to the Second Embodiment includes an image-capturing unit 11, a line-of-sight detector 12, a memory 13, and a controller 14. The configurations and functions of the image-capturing unit 11, the line-of-sight detector 12, and the memory 13 in the Second Embodiment are the same as in the First Embodiment. The configuration of the controller 14 in the Second Embodiment is the same as in the First Embodiment.

In the Second Embodiment, the controller 14 determines the reliability of an image IM based on the image IM, as in the First Embodiment. In the Second Embodiment, unlike the First Embodiment, the controller 14 estimates the degree of concentration of the subject based on a greater number frames of consecutively captured images IM, the lower the reliability. The controller 14 may, for example, estimate the degree of concentration using images IM in a range of frames within a time interval that extends further back in time from the most recent image IM as the reliability decreases or using images IM from a greater number of frames as the reliability decreases.

In the Second Embodiment, similarly to as in the First Embodiment, the controller 14 may estimate the degree of concentration by excluding, from among the multiple continuously captured images IM, images IM for which the speed of movement of the line of sight LS is greater than or equal to a threshold.

In the Second Embodiment, the controller 14 may output the calculated degree of concentration to the external device 15 similarly to as in the First Embodiment.

Figure 5:
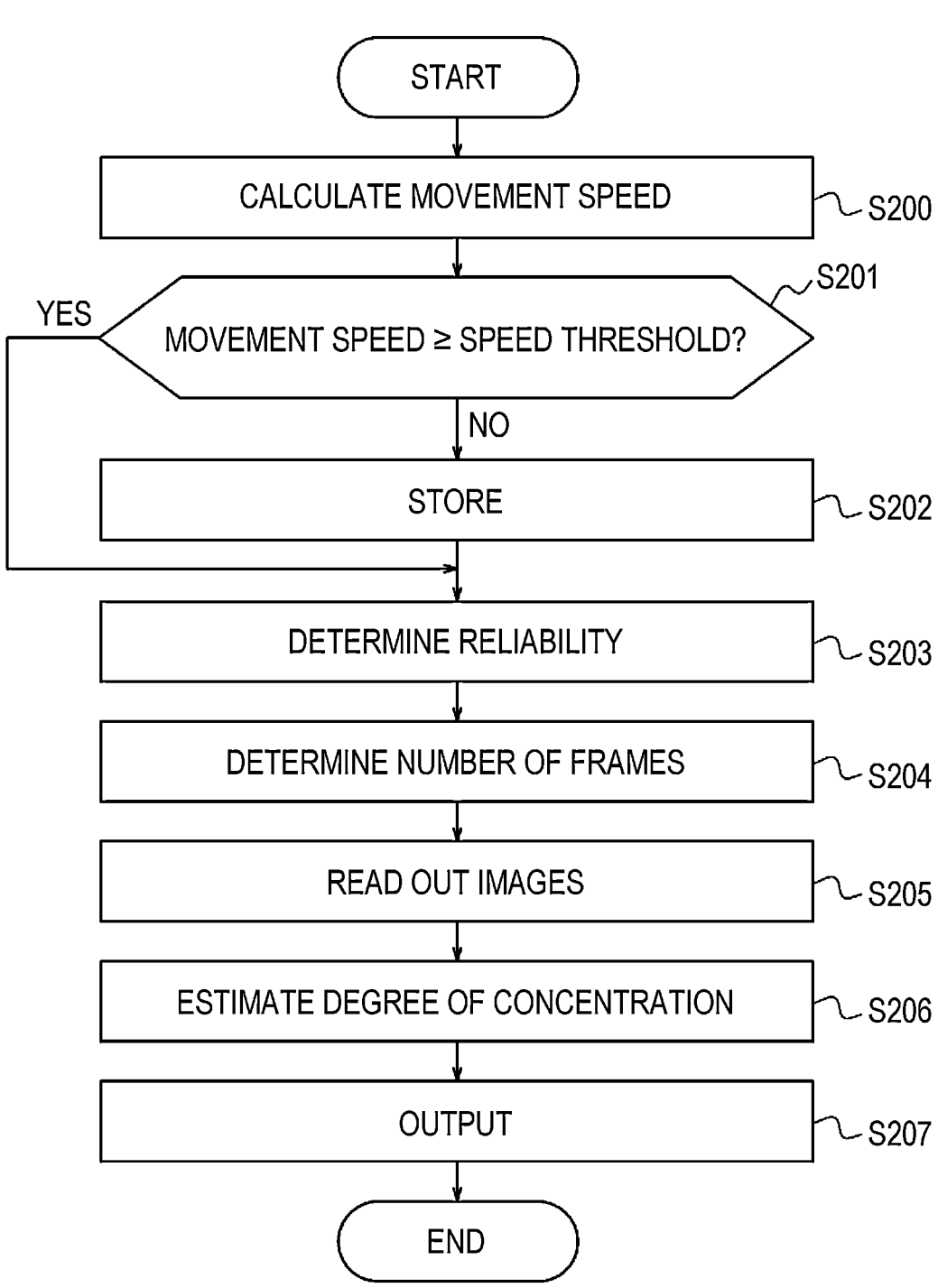
FIG. 5 is a flowchart for describing estimation processing performed by a controller in FIG. 1 in a Second Embodiment.

Next, estimation processing executed by the controller 14 in the Second Embodiment will be described using the flowchart in FIG. 5. The estimation processing starts whenever the controller 14 acquires an image IM of one frame and a line of sight LS.

In Step S200, the controller 14 calculates the movement speed of the acquired line of sight LS based on a comparison with a position PE of the line of sight LS acquired immediately previously. After the calculation, the process advances to Step S201.

In Step S201, the controller 14 determines whether the movement speed calculated in Step S200 is greater than or equal to a speed threshold. When the movement speed is not greater than or equal to the speed threshold, the process advances to Step S202. When the movement speed is greater than or equal to the speed threshold, the process advances to Step S203.

In Step S202, the controller 14 stores the image IM and the line of sight LS acquired at the start of the estimation processing in the memory 13. After storing the data, the process advances to Step S203.

In Step S203, the controller 14 determines the reliability based on the image IM acquired at the start of the estimation processing. After the determination, the process proceeds to Step S204.

In Step S204, the controller 14 determines the number of frames of images IM to be used in estimating the degree of concentration based on the reliability determined in Step S203. After the determination, the process proceeds to Step S205. For example, the controller 14 may increase the number of frames of images IM used to estimate the degree of concentration as the reliability determined in Step S203 decreases. For example, the controller 14 may set the number of frames of images IM to be used to estimate the degree of concentration to N1 when the reliability determined in Step S203 is less than or equal to a first threshold. The controller 14 may set the number of frames of images IM to be used to estimate the degree of concentration to N2 (N2<N1) when the reliability determined in Step S203 is greater than the first threshold. The number of frames of images IM used to estimate the degree of concentration may be determined in a stepwise manner by comparing the reliability with multiple thresholds, not just with the first threshold above.

In Step S205, the controller 14 reads out from the memory 13 the images IM going backwards in time for a number of frames that is one frame less than the number of frames determined in Step S204, together with the lines of sight LS corresponding to the images IM. After that, the process advances to Step S206.

In Step S206, the degree of concentration is estimated based on the image IM and the line of sight LS acquired at the start of the estimation processing and the images IM and lines of sight LS read out in Step S205. After the estimation, the process advances to Step S207.

In Step S206, the controller 14 outputs the degree of concentration calculated in Step S206 to the external device 15. After the output, the estimation processing ends.

The thus-configured electronic device 10 of the Second Embodiment estimates the degree of concentration of the subject based on consecutively captured images IM of a greater number of frames, the lower the reliability is. With this configuration, since the electronic device 10 increases the number of sets of an image IM and a line of sight LS used to estimate the degree of concentration when the reliability is low, the degree of concentration can be estimated while maintaining high estimation accuracy regardless of differences in reliability. The electronic device 10 may decrease the number of sets of an image IM and a line of sight LS used for estimating the degree of concentration when the reliability is high, and therefore the computational processing load of the controller may be reduced.

A variety of variations and amendments may be made to the content of the present disclosure based on the present disclosure by one skilled in the art. Accordingly, such variations and amendments are included in the scope of the present disclosure. For example, in each embodiment, each functional part, each means, each step and so on can be added to other embodiments so long as there are no logical inconsistencies, or can be replaced with each functional part, each means, each step, and so on of other embodiments. In each embodiment, a plurality of each functional part, each means, each step, and so on can be combined into a single functional part, means, or step or divided into multiple functional parts, means, or steps. Each of the above-described embodiments of the present disclosure is not limited to faithful implementation of each of the described embodiments, and may be implemented by combining or omitting some of the features as appropriate.

Figure 6:
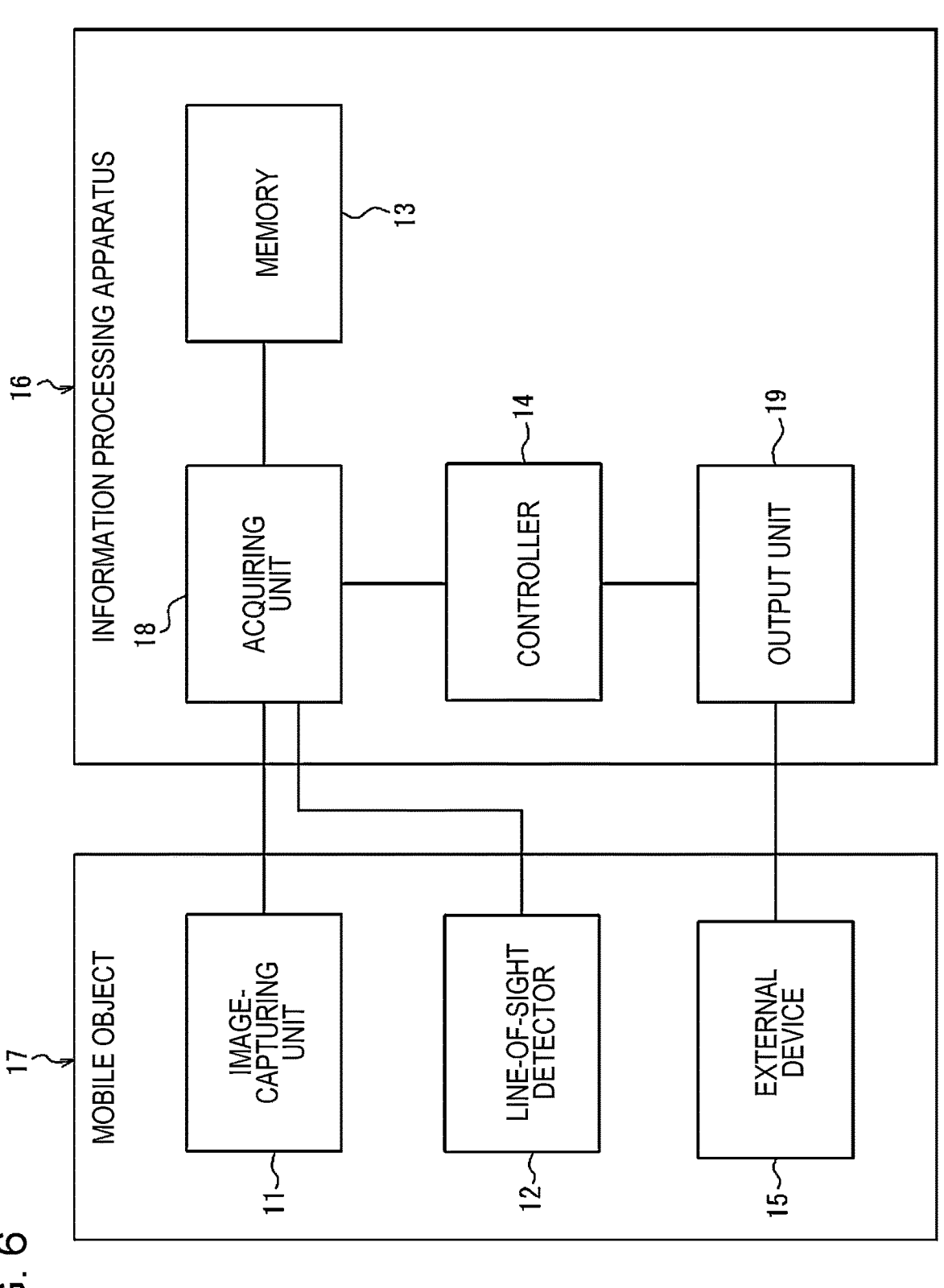
FIG. 6 is a block diagram illustrating an outline configuration of an information processing apparatus, which is a variation of the First Embodiment and the Second Embodiment.

In the First Embodiment and the Second Embodiment, the electronic device 10 includes the image-capturing unit 11 and the line-of-sight detector 12, and the controller 14 acquires an image IM and a line of sight LS to use in estimating the degree of concentration, but this configuration does not need to be adopted. As illustrated in FIG. 6, for example, an information processing apparatus 16, such as a cloud server, may estimate the degree of concentration based on the image IM and the line of sight LS, similarly to the electronic device 10. In such a configuration, the information processing apparatus 16 may acquire the image IM and the line of sight LS as information from a mobile object 17, in which the image-capturing unit 11 and the line-of-sight detector 12 are installed, via an acquiring unit 18. The information processing apparatus 16 may output the estimated degree of concentration via an output unit 19 to an external device 15 in the mobile object 17.

Many aspects of the content of the present disclosure are presented as a series of operations executed by a computer system or other hardware capable of executing program instructions. Computer systems and other hardware include, for example, general-purpose computers, personal computers (PCs), dedicated computers, workstations, personal communications system (PCS), mobile (cellular) telephones, mobile telephones with data processing capabilities, RFID receivers, games consoles, electronic notepads, laptop computers, global positioning system (GPS) receivers or other programmable data processing devices. Note that in each embodiment, various operations are performed by dedicated circuits (for example, individual logic gates interconnected to perform specific functions) implemented using program instructions (software), or by logic blocks or program modules executed by one or more processors. Examples of "one or more processors that execute logic blocks or program modules" may include one or more microprocessors, a central processing unit (CPU), an application specific integrated circuit (ASIC), a digital signal processor (DSP), a programmable logic device (PLD), a field programmable gate array (FPGA), a processor, a controller, a microcontroller, a microprocessor, an electronic device, or another device designed to perform the functions described herein, and/or any combination of these. The embodiments described herein are implemented, for example, using hardware, software, firmware, middleware, microcode, or any combination of these. Instructions may be program code or code segments for performing the required tasks. The instructions can be stored in a machine-readable non-transitory storage medium or another medium. Code segments may represent any combination of procedures, functions, subprograms, programs, routines, subroutines, modules, software packages, classes or instructions, data structures or program statements. Code segments transmit and/or receive information, data arguments, variables or stored content from and/or to other code segments or hardware circuits, and in this way, connect to other code segments or hardware circuits.

Machine-readable non-transitory storage media can be further configured as computer-readable physical carriers (media) configured as the categories of solid state memory, magnetic disks and optical disks, and an appropriate set of computer instructions such as program modules for causing a processor to perform the techniques disclosed herein and data structures are stored on such media. Computer-readable media include electrical connections with one or more wiring lines, magnetic disk storage media, magnetic cassettes, magnetic tapes, other magnetic and optical storage devices (for example, compact disks (CDs), laser disks, and digital versatile discs (DVDs), floppy disks and Blu-ray disks, portable computer disks, random access memory (RAM), read-only memory (ROM), rewritable programmable ROM such as EPROM, EEPROM, or flash memory, or other physical storage media capable of storing information, or a combination of any of these media. Memory can be provided inside and/or outside the processor/processing unit. As used herein, the term "memory" refers to any type of long-term or short-term storage, volatile, nonvolatile, or other memory, and the term does not limit the specific type or number of memories or the type of medium in which data is stored.

Note that a system is disclosed herein as having various modules and/or units that perform specific functions. These modules and units are illustrated in a schematic manner in order to briefly illustrate their functionality and do not necessarily represent specific hardware and/or software. In that sense, these modules, units, and other components may be hardware and/or software implemented to substantially perform the specific functions described herein. The various functions of the different components may be any combination of hardware and/or software or hardware and/or software used separately from each other, and can be used separately or in any combination. In addition, input/output or I/O devices or user interfaces, including but not limited to keyboards, displays, touch screens, pointing devices, and so forth, can be connected directly to the system or via an I/O controller interposed therebetween. Thus, various aspects of the contents of the present disclosure can be implemented in numerous different ways, all of which are included within the scope of the present disclosure.

REFERENCE SIGNS

10 electronic device
11 image-capturing unit
12 line-of-sight detector
13 memory
14 controller
15 external device
16 information processing apparatus
17 mobile object
18 acquiring unit
19 output unit
IM image
LS line of sight
MP line-of-sight prediction map
PE position corresponding to direction of line of sight

The invention claimed is:

1. An electronic device comprising:
an image-capturing unit configured to generate an image corresponding to a view by performing image capturing;
a line-of-sight detector configured to detect a line of sight of a subject with respect to the view; and
a controller configured to determine, based on the image, a reliability of the image as a source of estimation of a degree of concentration of the subject and configured to estimate the degree of concentration of the subject based on the reliability, the image, and the line of sight.

2. The electronic device according to claim 1, wherein the controller stops estimation of the degree of concentration when the reliability is less than or equal to a reliability threshold.

3. The electronic device according to claim 2, wherein the controller lowers the reliability threshold as a time for which estimation of the degree of concentration is stopped becomes longer.

4. The electronic device according to claim 1, wherein the controller estimates the degree of concentration of the subject based on the images of a greater number of frames, the lower the reliability, the images being consecutively captured.

5. The electronic device according to claim 1, wherein the controller determines the reliability by calculating the reliability based on at least one out of a type, a number, and a position of an element included in the image.

6. The electronic device according to claim 5, wherein the element may be any one out of a vehicle, a pedestrian, road geometry, a sign, a signal, and an optical flow.

7. The electronic device according to claim 1, wherein the controller determines the reliability by estimating the reliability based on the image, a relationship between the learning image and information on the reliability being constructed using machine-learned learning data.

8. The electronic device according to claim 1, wherein the controller is further configured to calculate the reliability based on at least one out of a type, a number, or a position within an image of an element included in the image detected by image recognition.

9. An information processing apparatus comprising:
an acquiring unit configured to acquire an image corresponding to a view and a line of sight of a subject to the view;
a controller configured to determine, based on the image, a reliability of the image as a source of estimation of a degree of concentration of the subject and configured to estimate the degree of concentration of the subject based on the reliability, the image, and the line of sight; and an output unit configured to output the degree of concentration.

10. The information processing apparatus according to claim 9, wherein
the controller is further configured to calculate the reliability based on at least one out of a type, a number, or a position within an image of an element included in an image detected by image recognition.

11. A non-transitory computer-readable recording medium including a degree-of-concentration calculation program configured to cause a computer to function as:
an image-capturing unit configured to generate an image corresponding to a view by performing image capturing;
a line-of-sight detector configured to detect a line of sight of a subject with respect to the view; and
a controller configured to determine, based on the image, a reliability of the image as a source of estimation of a degree of concentration of the subject and configured to estimate the degree of concentration of the subject based on the reliability, the image, and the line of sight.

12. The non-transitory computer-readable recording medium according to claim 11, wherein
the controller is further configured to calculate the reliability based on at least one out of a type, a number, or a position within an image of an element included in an image detected by image recognition.

13. A degree-of-concentration calculation method comprising:
generating an image corresponding to a view by performing image capturing;
detecting a line of sight of a subject to the view;
determining, based on the image, a reliability of the image as a source of estimation of a degree of concentration of the subject; and
estimating the degree of concentration of the subject based on the reliability, the image, and the line of sight.

14. The degree-of-concentration calculation method according to claim 13, wherein
the determining includes calculating the reliability based on at least one out of a type, a number, or a position within an image of an element included in an image detected by image recognition.

* * * * *